J. C. MUNDEL.
Seeding-Machine.

No. 202,571. Patented April 16, 1878.

Attest:
E. E. Caust
August Petersohn

Inventor:
J. C. Mundel
by Louis Bagger & Co.
Attys.

UNITED STATES PATENT OFFICE.

JACOB C. MUNDEL, OF ARROWSMITH, ILLINOIS.

IMPROVEMENT IN SEEDING-MACHINES.

Specification forming part of Letters Patent No. 202,571, dated April 16, 1878; application filed August 13, 1877.

*To all whom it may concern:*

Be it known that I, JACOB C. MUNDEL, of Arrowsmith, in the county of McLean and State of Illinois, have invented certain new and useful Improvements in Seeding - Machines; and I do hereby declare that the following is a full, clear, and exact description thereof, which will enable others skilled in the art to which it appertains to make and use the same, reference being had to the accompanying drawings, which form a part of this specification, and in which—

Figure 1:
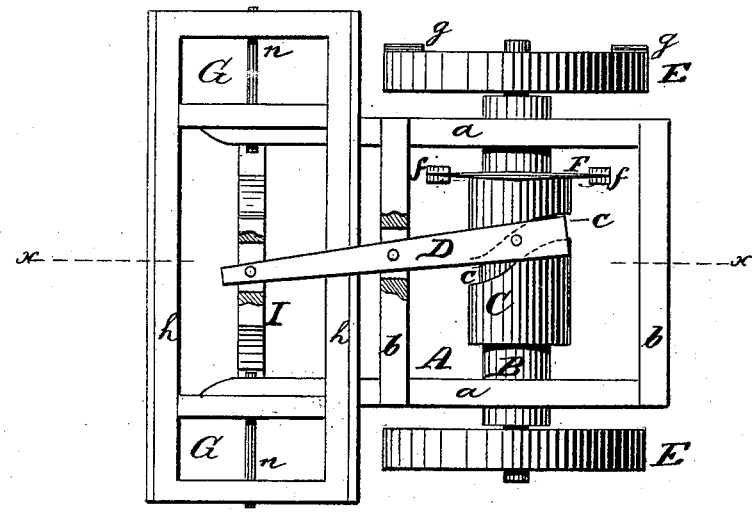
Figure 2:
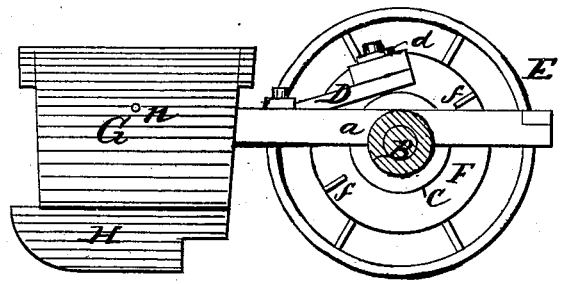
Figure 3:
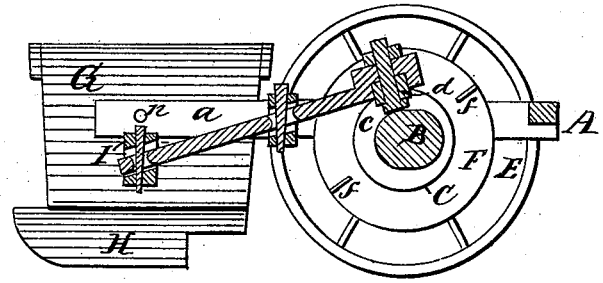

Figure 1 is a top plan. Fig. 2 is a side elevation, the wheel being removed; and Fig. 3 is a longitudinal vertical section after the line $x\, x$ in Fig. 1.

Similar letters of reference indicate corresponding parts in all the figures.

The object of my invention is to produce a simple, cheap, durable, and easily-operated check-row corn-planter; and its construction and operation are as I shall now proceed more fully to describe.

In the drawings, A is a frame, consisting of two side pieces, $a\, a$, united by cross-braces $b\, b$. In the rear part of frame A are boxes for the axle B, carrying the wheels E E, upon which the frame is supported. One of these wheels, at least, must be affixed solidly upon the axle. This latter has a swelled portion, forming a solid cylinder, C, which is provided with a circumferential eccentric-groove, $c$.

D is a lever, pivoted in a slot in the front cross-brace $b$ of frame A. At its rear end it carries a horizontal wheel or caster, $d$, traveling in groove $c$, by which means a reciprocating or vibrating motion is imparted to lever D, which, in its turn, operates the seed-slide, as hereinafter described.

Upon the axle B is secured a sharp-edged wheel, F, having markers $f\, f$ disposed around the periphery thereof. One of the wheels E (which is secured solidly upon the axle) is also provided with markers $g\, g$, of suitable construction.

G G are the seed-boxes, which are connected by cross-bars $h\, h$. The frame A is pivoted, by the front ends of its side pieces $a\, a$, upon the sides of the seed-boxes, facing each other, as shown. The seed-box frame is not supported upon wheels, but directly on top of the colters H H, which are secured under the seed-boxes.

I is the seed-slide, which reciprocates between the boxes, and feeds the grain in the usual manner. It is operated by lever D, the front end of which is pivoted in a slot in the center thereof.

When, in operation, the machine is dragged over a field, the axle revolves with the wheels E E, thus imparting to lever D a vibrating motion, in the manner described, and operating the seeding mechanism. The markers, of which two are secured upon wheel E, mark the hills in which the seed is dropped. The distance between the hills is regulated by the size of the wheels. If the wheels E E are too large, they may be detached from the frame, and the wheel F, which is of a smaller diameter, will then come into play, thus bringing the hills closer together.

As will be observed from the foregoing description, and by reference to the drawings hereto annexed, my improved corn-planter is composed of but few parts, and is therefore not apt to get out of order. It is, moreover, simple, durable, and cheap.

By placing the reciprocating lever D in an oblique or slanting position, as shown, and placing the seed-slides below the point $n$, where the frame carrying the seed-boxes is pivoted to frame A, the seed-boxes may be placed quite near the ground, so that the seed may be dropped into the drills without the use of rubber tubes or conveyers; and this arrangement also facilitates the draft of the machine.

Having thus described my invention, I claim and desire to secure by Letters Patent of the United States—

The combination of the frame A, axle B, having grooved cylinder C, detachable wheels E E, and solid wheel F, of less diameter, with the hinged seed-boxes, slide I, and lever D, all arranged and operating substantially as described, for the purpose shown and specified.

In testimony that I claim the foregoing as my own I have hereto affixed my signature in presence of two witnesses.

J. C. MUNDEL.

Witnesses:
N. HAWK,
B. D. NEWCOMB.